Nov. 23, 1965  W. T. DOYLE  3,219,185
METHOD AND APPARATUS FOR SEPARATING LOW MICRON SIZE PARTICLES
Filed March 6, 1963  5 Sheets-Sheet 2
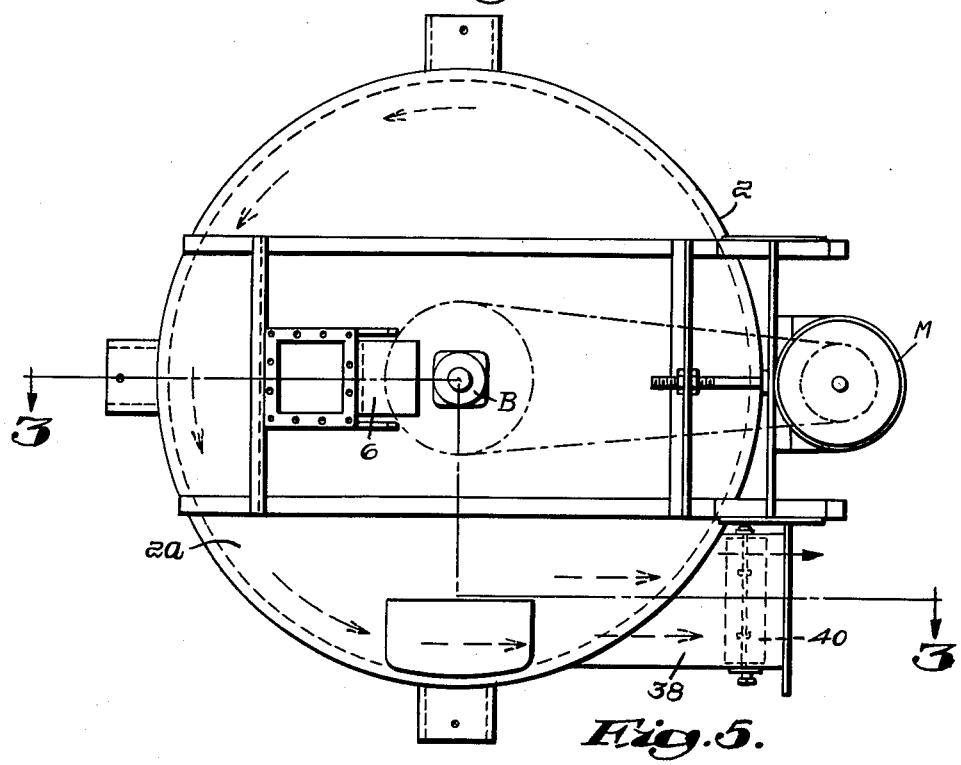
*Fig. 2.*
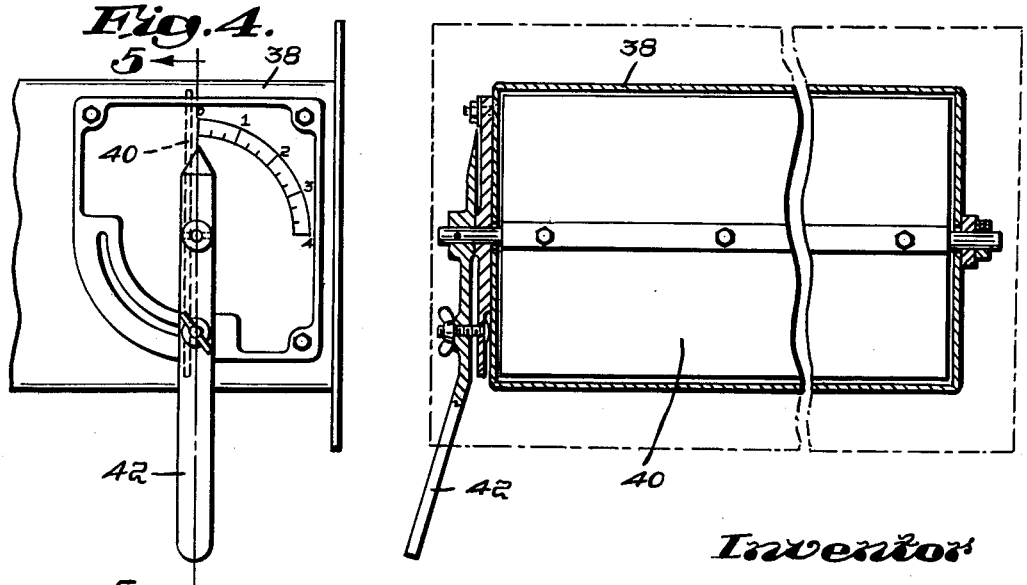
*Fig. 4.*  *Fig. 5.*
Inventor
William T. Doyle
by
Attorney Nov. 23, 1965 W. T. DOYLE 3,219,185
METHOD AND APPARATUS FOR SEPARATING LOW MICRON SIZE PARTICLES
Filed March 6, 1963 5 Sheets-Sheet 3

Inventor
William T. Doyle
Thomas V. Hamilton
by
Attorney

Nov. 23, 1965  W. T. DOYLE  3,219,185
METHOD AND APPARATUS FOR SEPARATING LOW MICRON SIZE PARTICLES
Filed March 6, 1963  5 Sheets-Sheet 4
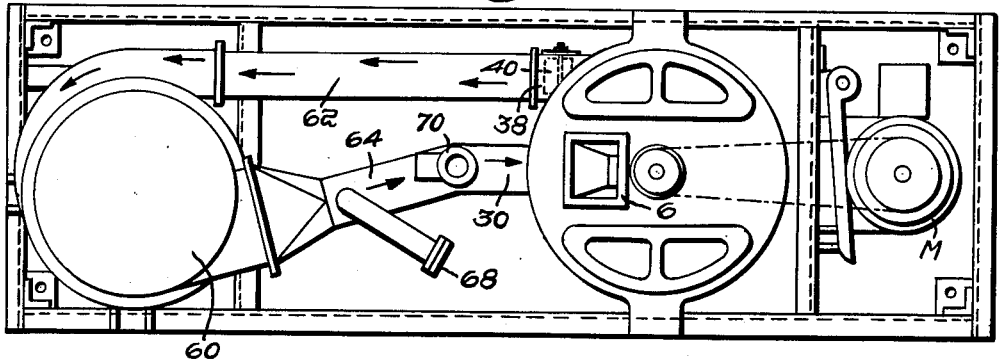
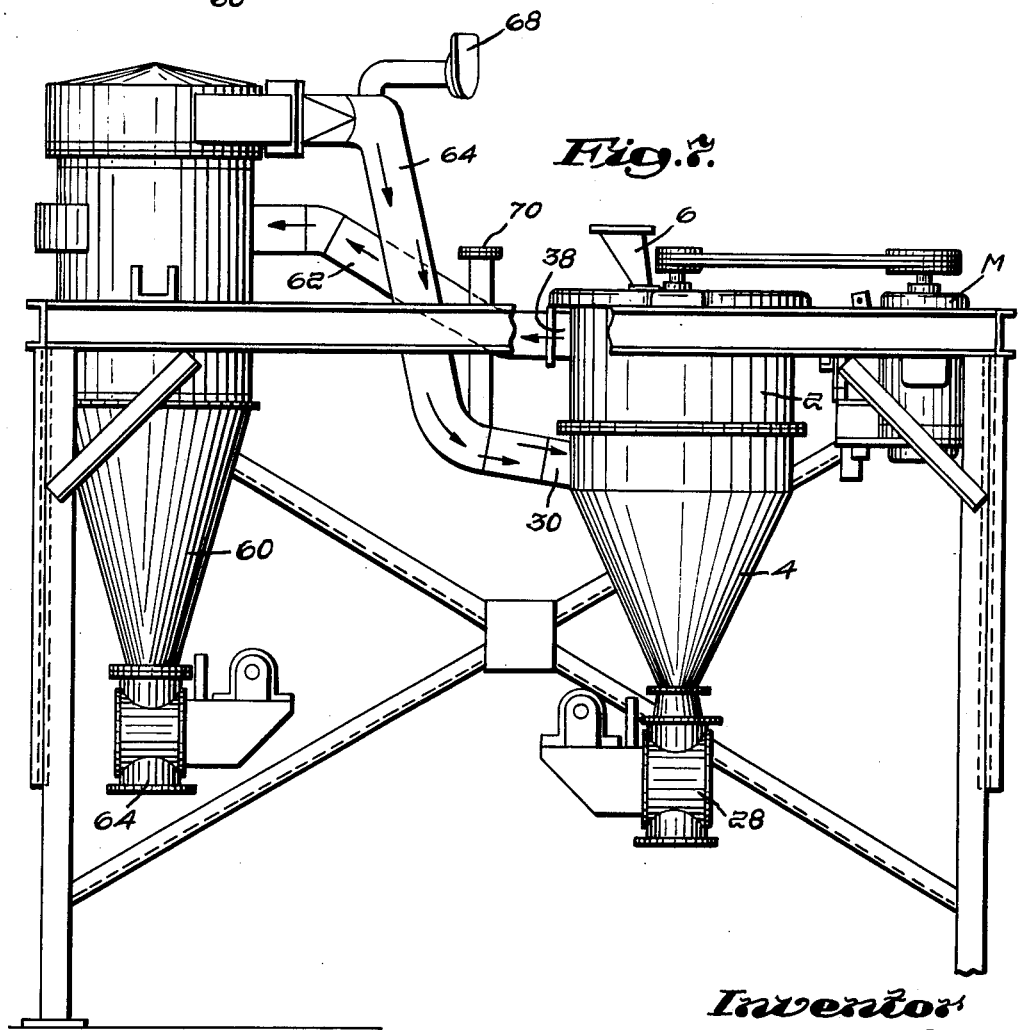

Nov. 23, 1965 W. T. DOYLE 3,219,185
METHOD AND APPARATUS FOR SEPARATING LOW MICRON SIZE PARTICLES
Filed March 6, 1963 5 Sheets-Sheet 5

Inventor:
William T. Doyle
by Munro H. Hamilton
Attorney

United States Patent Office 3,219,185
Patented Nov. 23, 1965

3,219,185
METHOD AND APPARATUS FOR SEPARATING LOW MICRON SIZE PARTICLES
William T. Doyle, Boston, Mass., assignor to Sturtevant Mill Company, Boston, Mass., a corporation of Massachusetts
Filed Mar. 6, 1963, Ser. No. 263,333
4 Claims. (Cl. 209—139)

The present application is a continuation-in-part of applications Serial No. 824,101, filed June 30, 1959 (abandoned); Serial No. 33,008, filed May 31, 1960 (abandoned); Serial No. 45,740, filed July 27, 1960 (abandoned); Serial No. 123,357, filed July 3, 1961 (abandoned); and Serial No. 186,820, filed April 5, 1962, Patent No. 3,090,487 issued May 21, 1963.

This invention relates to separating and classifying finely divided materials and in particular to an improved air classifying method and apparatus for processing a given mass of granular or pulverized material and removing from the mass one or more fractions whose component particles are of a predetermined fineness or lie within a narrow range of particle sizes.

A specific instance of a material wherein a small quantity of low micron size particles are present may consist of a protein bearing flour and the invention method is especially concerned with processing a protein bearing flour in order to remove low micron protein particles occurring in a range of percentages, for example, from 5% to 10% of the total mass of flour processed. The low micron protein particles making up this protein fraction may occur, for example, in a range of sizes of from 2 to 3 microns up to 10 to 15 microns. It should be understood that such low micron size particles of other materials may also be separated and the invention may be practiced with respect to chemicals, minerals, plastic substances, and various other materials.

Air classifying of the general type with which the present invention is concerned is well known in the art and is carried out by causing a finely divided or ground material to fall onto rotatable distributor plate means. Particles are centrifugally displaced with relatively coarse particles being thrown outwardly a greater distance than relatively fine particles. A current of air is induced to flow upwardly through the cascading material within an inner conduit body and draw a desired range of relatively fine particles through selector blades and thence upwardly through a fan member. Thereafter, the fine particles pass down into an outer fine discharge conduit, while the coarser material, which was not lifted by the current of air, is allowed to fall through the inner conduit. Ordinarily, the carrier air is recirculated and passes through openings extending between the inner and outer conduits.

In conventional air classifying machines of this general type, limiting conditions are encountered when attempting to remove very small fractions of extremely fine material. One condition is excessive speed of air flow induced by the fan. It should be understood that for practical reasons, the fan in such machines is directly connected to the same shaft which drives the centrifugal distributing plate from which a mass of unsized particles are required to be displaced outwardly. The speed of the shaft necessary for adequate centrifuging action necessarily results in a very powerful fan which tends to counteract the selectivity of the selector blades by inducing too rapid a flow of air. The result is that a certain amount of coarser particles in a quantity greater than desired, are lifted and carried through the fan regardless of the setting of the selector blades and thus a desirable degree of selectivity is not realized.

Another limiting condition is the tendency for carrier air as it passes down through the outer fines conduit to be drawn through space between return air vanes occurring between the inner and outer conduits and thus to become recirculated through the system. This operates to saturate the air undesirably with particles and to decrease significantly the capacity of the air for picking up and carrying away a relatively small fraction of very fine particles. Therefore a loss of efficiency may occur in this way also.

It will be appreciated that conditions of the sort indicated limiting the efficiency of the machine become even more of a problem when dealing with very low micron size particles which occur as a very small percentage of a total mass.

It is a chief object of the invention to provide an improved method and apparatus for air classifying wherein small fractions or percentages of very low micron size particles may be removed from a mass of relatively larger particles.

Another object is to devise a method of the class described wherein a dual fines collecting system is employed.

Another object is to control a flow of air induced by a classifier fan of the type which rotates with a centrifugal distributor plate so that particles coarser than those desired to be removed will not be carried up into the fan by reason of the circulation of air through the fan being retarded while the fan speed is maintained constant.

It is a further object of the invention to devise an improved method and apparatus for selective air classifying wherein a predetermined fraction of extremely fine material may be removed from a mass of relatively larger particles by lifting the fine material upwardly through a fan mechanism and thereafter conducting the fraction of fine material along a path of flow which extends tangentially away from the fan blade extremities to a suitable collecting device.

I have discovered that the foregoing objectives may be realized by a method of air classifying which is based on the novel concept of operating a fan in a substantially sealed cyclone type air classifier system having special air inlet and air outlet means and by constructing the air outlet means in a novel tangentially extending relationship with respect to the fan and air classifying system.

In this classifier system inner and outer conduits are arranged so that they communicate only at the top of the classifier system where the tangentially extending outlet is connected. Thus fine particles are drawn upwardly through the inner conduit and fan. Some of these particles may be directed outwardly through the tangentially extending outlet structure in a manner hereinafter described in more detail. Other particles drawn up through the fan may be conducted downwardly through the outer conduit in a spiralling path of flow.

Control of flow of air may, in accordance with the invention, be exercised to build up an increased static pressure or back pressure against which the fan is working. As a result the fan, even though rotating at a relatively high r.p.m., nevertheless does not move as great a volume of air through the system as it normally would do and thus cooperates with the rotary sizing blades to provide a unique selectivity for very fine particle separation. This may be accomplished to a very desirable extent by controlled valving of the air flow in the inlet and outlet pipes. Selectivity of an even more precise nature may be further obtained by arranging a special outlet pipe very near to the top of the air classifier system in tangential relationship to the rotary path of travel of the fan blades and by providing a regulating valve in this outlet.

As a result of air flow control of the character indicated a stream of air and fine particles may be drawn from the inner conduit upwardly in a spiralling path through the fan and then over into the outer conduit. As the particles reach the top of the sealed classifier system, upward travel is arrested and the particles then momentarily circulate around the top of the classifier system at a retarded rate of flow. Thereafter they are conducted in a downwardly spiralling path through the space between the inner and outer conduits.

I have discovered that by providing for a valve controlled flow of air and particles away from the classifier through a tangentially extending outlet which communicates with the top of the air classifying system when the fan is rotating a maximum control of selectivity of an exceedingly precise nature is obtained. By arranging for a tangentially arranged outlet to communicate with a stream of particles circulating momentarily at a retarded rate of flow around the top of the classifier system it becomes possible to exercise at this particular point an extremely sharp control. Very low micron size particles can be removed and conducted through the tangential outlet to a collector at one point while removing other slightly larger micron size particles in a second collector located at a lower point in the air classifying system.

In supplying air in accordance with the invention, it is desirable to provide for limited quantities of fresh air being introduced into the system and I provide for a fan-induced flow of air being conducted through a conduit directly into a sealed inner classifying compartment. From here the air is drawn upwardly into an outer conduit for the fines. Coarse particles drop into the bottom of an inner closed tailings conduit located in spaced relation to the outer fines conduit and are removed through a valve controlled outlet. The fines conduit also includes a discharge opening which is sealed off with a rotary valve. Thus the air which has conveyed the fines portion through the fan and into the fines compartment can be controlled and caused to leave the system through a valve controlled outlet in a regulated manner variable with the degree of selectivity required.

I have determined that the size of the opening through which carrier air is discharged may be regulated very precisely to control the quantity of air flowing into the fan at any given time. The effect of this is to provide for maintaining a relatively high rotative speed of the distributor plate while simultaneously inducing a materially limited flow of air whose lifting power cooperates with the rotary sizing device to remove only very fine particles constituting a small fraction of the cascading mass.

I have still further found that in carrying out a separation of very fine particles in the manner above noted, I may utilize a separate collector which is connected to the lower end of the fines chamber to collect a second fraction of fines as a separate operation. In this way I recover two separate amounts of fine material and I am further enabled to provide two grades of very fine material so that a more efficient collecting is realized.

The nature of the invention and its objects will be more fully understood and appreciated from the following description of a preferred embodiment of the invention selected for purposes of illustration and shown in the accompanying drawings, in which:

FIGURE 2 is a plan view of the structure shown in FIGURE 1;

FIGURE 4 is a detail view of valve means shown in FIGURE 2;

FIGURE 5 is a cross section taken on the line 5—5 of FIGURE 4;

FIGURE 6 is a plan view showing a portion of the classifier and also illustrating a vertical collector apparatus;

FIGURE 7 is a side elevational view of the classifier and particle collector apparatus shown in FIGURE 6;

Figure 1:
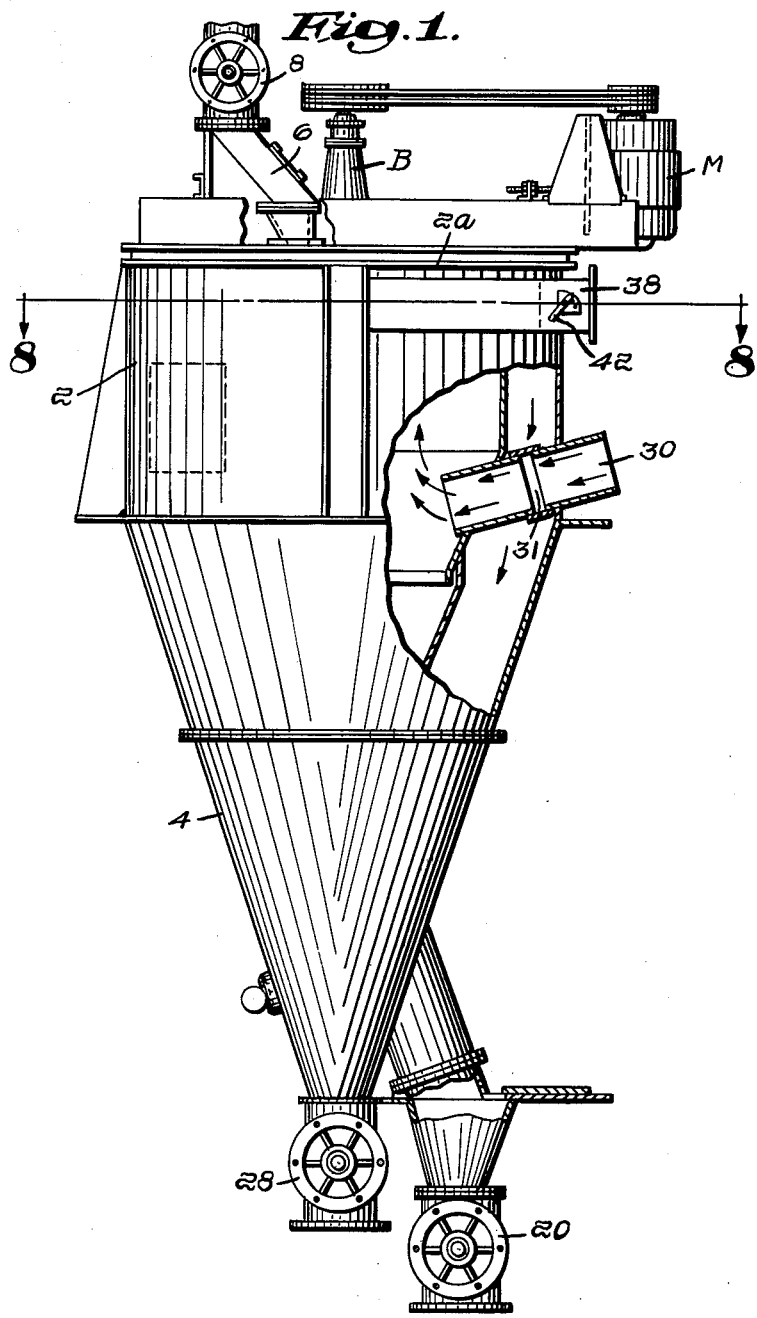
FIGURE 1 is a side elevational view of the air classifier apparatus of the invention shown independently of collector means.
Figure 3:
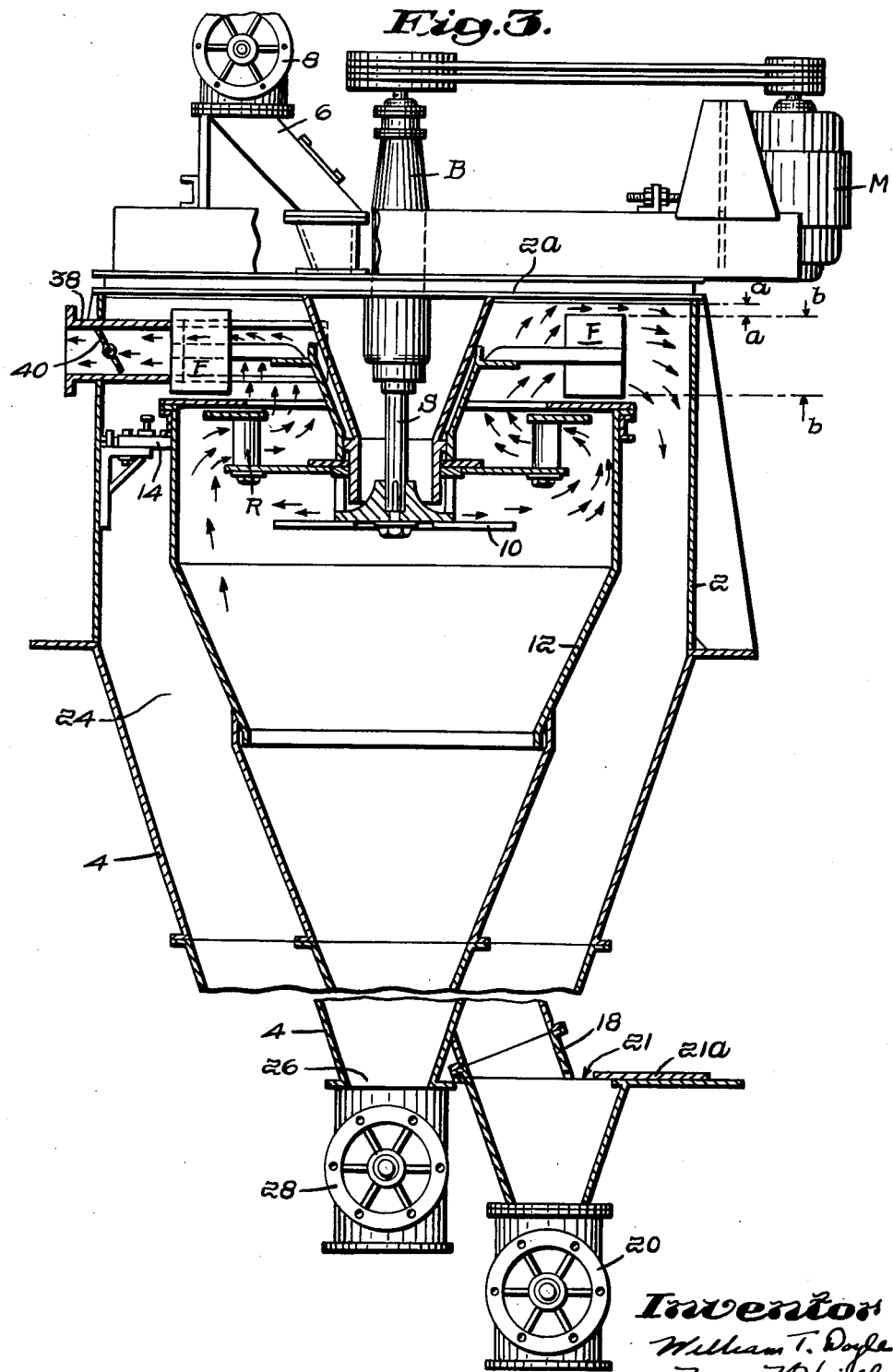
FIGURE 3 is a vertical cross sectional view of a portion of the classifier apparatus of the invention taken on line 3—3 of FIGURE 2.

Considering in further detail the method and apparatus referred to, attention is directed to the structure illustrated in FIGURES 1 and 3. As shown therein a substantially sealed system is comprised by an outer closed casing 2 which is formed with a conical lower section 4, and a top cover section 2a. The section 2a has vertically supported therethrough a bearing B in which is received a shaft S driven by a motor M. The shaft has fixed thereto a distributor plate 10 and rotating vane sizing device R to which is secured a fan member F. The motor and driving arrangement for fan and plate are conventional.

Pulverized material such as, for example, a flour which is desired to be separated into required fractions is introduced through a feed inlet 6 which at its upper end may be closed by a conventional rotary valve 8 of conventional nature. By means of this arrangement, material may be fed into the separator system without permitting a flow of air into the casing to take place.

Material from the feed inlet is received on the rotating plate 10 of the class well known in centrifuging separators of this general nature. Incoming material is centrifugally displaced by the rotating plate to provide for separation of relatively fine particles and relatively coarse particles occurring as a cascading mass. An inner tailings conduit for coarse particles of the free falling mass is comprised by a conical member 12 supported on inner flanges 14 and located in spaced relation to the inner periphery of the parts 2 and 4 to define an annular passageway 24.

The lower end of the conical conduit 12 communicates with a tailings discharge outlet 18 which projects angularly through the section 4 and which is provided with an opening 21 closed by a sliding cover 21a, and which is sealed at its lower end by a rotary valve 20. This valve permits discharge of tailings while preventing entrance of any external air into the tailings conduit 12. The passageway 24 terminates in a fines outlet 26 which is, in accordance with the invention, also closed by means of a rotary valve 28 so that no flow of air can take place through this outlet. It will be observed that the tailings conduit does not, at any point below the fan, communicate with the fines conduit.

With this unique closed casing structure, I combine two other novel air control components. One component consists of a tubular air inlet 30 having a valve 31. A second component consists of a special outlet member 38 having a valve 40. Member 30 is located transversely through both the casing 2 and the inner tailings conduit 12 so that an isolated flow of air may pass into the system as shown by the arrows in FIGURE 1.

The inner extremity of the conduit 30 preferably occurs in a position such that it may conduct the isolated air through the casing 2 and deliver it directly into the path of the free falling mass of particles from the rotating plate 10 above noted and at points where it may be most effectively induced to flow upwardly through the mass of particles. Thus an inward flow of air may be induced by the fan member F and air may be discharged from the classifier through the outlet member 38.

This upwardly moving fan induced stream of air operates to remove fine particles in a required range of sizes from the centrifuged material cascaded from the rotating distributor plate. The remaining coarse material passes down through conduit 12 and out valve 20. The current of air draws the selected particle sizes through the conventional deflector sizing vanes R, which function to size the material, depending upon the spacing and number of vanes employed.

accompanying drawings is designed to operate on a commercial scale and to handle approximately 3,000 pounds per hour of a wheat flour occurring in a ground state in which from about 6% up to 15% by weight of the material is known to be protein particles having sizes of from 1 or 2 microns up to 10 to 15 microns.

I have found that operating the machine shown in the drawings with a commercial grade of ground flour may result in a separation and removal of approximately 5% to 10% by weight of the total mass and this 5% to 10% fraction is largely composed of protein particles in the range of from 2 to 3 microns up to 10 to 15 microns. This is accomplished by adjusting the damper 40 in the outlet member 38 so that the cross sectional discharge area of this member 38 is reduced practically 75% of the total aperture opening of the conduit 38.

In comparison with this, when the damper 40 is completely opened to permit a maximum passage of air through the outlet member 38, it is found that the percentage of material removed may run from 40% to 50% of the total quantity of material processed and of this 40% to 50% the micron sizes may vary from 1 or 2 microns, all the way up to 50 microns.

The invention may also be practiced in a further modified form in which the air flow through the fan is controlled at the suction side of the fan rather than at the discharge side. For example, I may carry out desirable separation and removal of protein particles from a sample of flour by retarding the flow of air into the fan. This, I find, may be accomplished by means of a valve device such as the damper 31 arranged in the inlet 30, as illustrated in FIGURE 1. In using this damper 31 the outlet 38 may be maintained in a fully opened position or a partially open position. The setting of damper 31 is then registered in the manner described with reference to damper 40 to retard air flow to a point at which the small fraction of minute protein particles may be selectively removed. I may also desire to retard flow by regulating both the dampers 31 and 40, in relation to one another, and these members may also be varied in size and setting in predetermined relationship to one another.

It is to be understood that the inner and outer chambers are sealed from each other and that the outer chamber wall is sealed from atmosphere. The only communication between the inner chamber and the outer chamber is through the port at the top of the inner cylinder shell which leads through the vacuum fan and that the discharge through this fan is varied by the control of the air port to the inner cylinder and/or the control of the discharge opening from the outer shell. The modification of the fan volume output is dependent upon the amount of air supplied by the air input to the inner cylinder which is restricted to less than the fan output during operation. This produces the new result set forth above. Likewise, the function of the fan may be modified by varying the output capacity from the outer shell or varying both the air input to the inner shell and the output capacity form the outer shell. These operations result in the new, novel and more efficient operation of the parts as indicated by the examples above set forth.

From the foregoing disclosure, therefore, it will be evident that I have discovered a new and useful method and machine for fine particle air classification. While I have shown preferred forms of the invention, it will be understood that various other modifications may be resorted to in keeping with the spirit of the appended claims.

I claim:

1. An improved centrifugal air separator including an outer casing sealed against atmosphere, a sealed inner casing forming an inner chamber arranged within the outer casing and spaced from the walls of the outer casing to provide a space therebetween forming an outer chamber, an annular discharge port formed in the upper portion of the inner chamber and forming the sole communication between the chamber of the inner casing and the space between the inner and outer casings, a feed inlet located at the top of the outer casing and extending into the inner casing for introducing a finely divided material into said inner casing, said feed inlet including a sealing means to prevent communication with the annular space between the inner and outer casings and the feed means, a rotatable distributor plate arranged in the upper part of the inner casing and below said inlet to receive material from the feed inlet and centrifugally displace the material within the inner casing to provide a separation of relatively fine and relatively coarse particles occurring as a falling mass from said feed inlet, a power driven suction fan mounted for rotation with the distributor plate and located in the outer casing adjacent said annular discharge port in the inner casing to induce flow of air upwardly through the free falling mass of particles through said annular port and into the annular space between the inner and outer casings, a rotating sizing device mounted between the distributor plate and the suction fan and within said inner casing for simultaneous rotation with said distributor plate and fan, an air inlet extending through the outer casing and into the inner casing and sealed from communication with the space between the inner and outer casings for directing a current of air into the inner casing in a direction to intercept the material cascading from the said distributor plate, a tubular outlet located at the top of the outer casing in tangential relationship therewith and having an arcuate aperture communicating with the space between the inner and outer casing to provide a passageway through which fine material may be removed along a path of travel which extends tangentially away from the outer casing, an adjustable valve in the said tubular outlet for restricting the flow of air therethrough to maintain in the inner sealed casing a volume of air less than the normal flow of air inducd by the suction of the fan at the annular discharge port in the inner casing to regulate the lifting force of the fan and control the size and quantity of particles released from the inner casing, a normally closed discharge port for the outer casing located above the bottom thereof, and support and drive means for the distributor plate, suction fan and sizing device mounted at the top of the outer casing, and said tubular outlet being connected to the outer casing at points closely adjacent to the extremities of the said fan whereby the fan blades may cooperate with the tubular outlet to sweep particles into the arcuate aperture of the tubular outlet in a tangentially directed manner.

2. An improved centrifugal air separator including an outer casing sealed against atmosphere, a sealed inner casing forming an inner chamber arranged within the outer casing and spaced from the walls of the outer casing to provide a space therebetween forming an outer chamber, an annular discharge port formed in the upper portion of the inner chamber and forming the sole communication between the chamber of the inner casing and the space between the inner and outer casings, a feed inlet located at the top of the outer casing and extending into the inner casing for introducing a finely divided material into said inner casing, said feed inlet including a sealing means to prevent communication with the annular space between the inner and outer casings and the feed means, a rotatable distributor plate arranged in the upper part of the inner casing and below said inlet to receive material from the feed inlet and centrifugally displace the material within the inner casing to provide a separation of relatively fine and relatively coarse particles occurring as a falling mass from said feed inlet, a power driven suction fan mounted for rotation with the distributor plate and located in the outer casing adjacent said annular discharge port in the inner casing to induce flow of air upwardly through the free falling Some of the selected particles pass through the fan and are conducted in a downwardly spiralling path to the discharge outlet 26, from which they are discharged by the rotary valve 28 into a container of any conventional nature. This provides one fraction of fines. Another substantial portion of the fines drawn upwardly through the fan is caused to move outwardly through the outlet member 38 to a collector apparatus which, in one preferred form, is arranged to provide a return flow of air as illustrated in FIGURES 6 and 7.

It will be observed that the particles in moving along the several paths of flow described are caused to travel at varying speeds. This may be more readily understood from an inspection of FIGURE 3 wherein it will be noted that directional arrows indicate relatively rapid flow of particles upwardly through the sizing device and the fan F.

As the particles reach the top of the sealed classifier system, it will be apparent that upward travel is arrested and the particles tend to move radially outwardly over the fan along the region included between the lines a—a in FIGURE 3. Thereafter the particles circulate around the top of the classifier system at a retarded rate of flow in a region generally included between the lines b—b of FIGURE 3. In this region the particles are held up momentarily and descend very slowly. Below this region the particles are caused to move downwardly with increasing speed in a spiralling path of flow.

An important feature of the invention consists in the combination with the classifier casing 2 of a tubular valve controlled outlet member of special shape and arrangement designed to take advantage of the momentarily retarded rate of flow of particles circulating around the top of the air classifier system in the region generally included between the lines b—b of FIGURE 3 so that a very desirable fraction may be removed.

Figure 8:
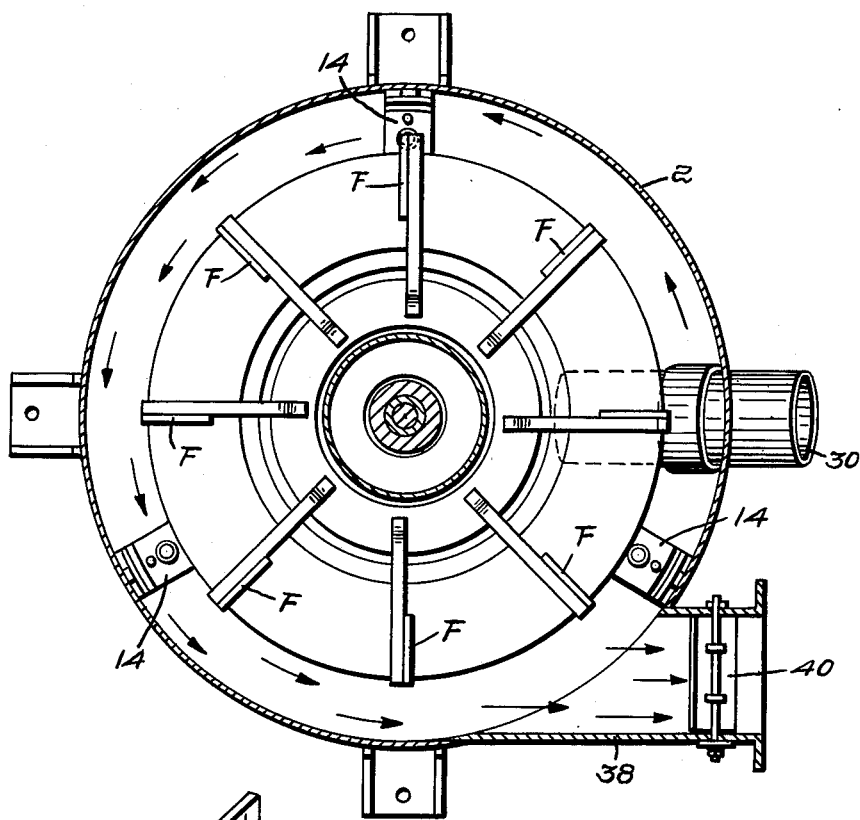
FIGURE 8 is a cross sectional view taken on the line 8—8 of FIGURE 1.

As earlier pointed out, the outlet member 38, with its valve means 40, is designed to regulate flow of carrier air out of the air classifying system. In addition, the outlet member is located at the top of the classifier casing 2, as shown at the left hand side of FIGURE 3 in a position such that it lies in substantially tangential relationship to the rotary path of flow of the fan blades as best shown in FIGURES 3 and 8.

Figure 9:
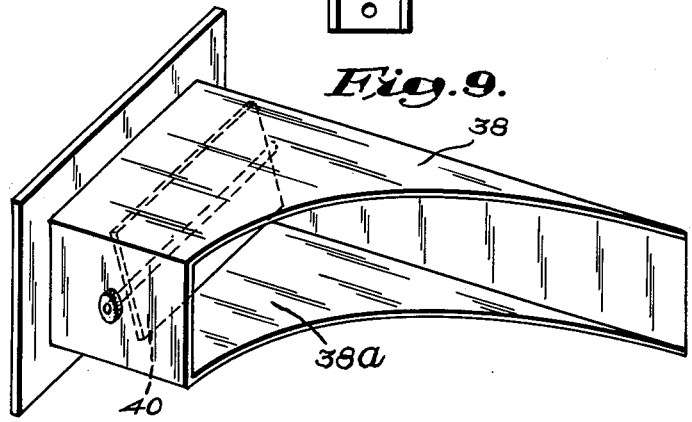
FIGURE 9 is a detail perspective view of a spiral tangential outlet pipe structure of the invention.

In FIGURE 9, I have illustrated the outlet member 38 removed from the classifier structure and as will be observed from an inspection of this figure the outlet 38 is of a unique tubular formation having an arcuate inner opening 38a which is adapted to be connected into a sidewall portion of conduit 2 in the region of particle flow defined by the lines b—b.

Thus it will be apparent that particles lifted through the fan and thereafter caused to move around the region a—a at a retarded rate of flow are in a position to readily become guided into the outlet member 38. It will also be understood that the outer tips of the blades of fan F tend to sweep these slowly descending particles around the classifier system in such a way that relatively smaller particles tend to seek a path of travel away from the casing and out through the tangential outlet opening of the member 38, while the remainder of the particles travel downwardly in a spiralling path of movement.

Since this outlet member 38 is the only outlet through which air may be discharged from the system, it constitutes a desirable means for retarding such flow of air by utilizing a damper member or valve 40 as shown in the drawings. In accordance with the invention I control the rate of flow of air through the outlet 38 by locating the valve 40 in desired positions of adjustment. This may be done by means of the handle 42, more clearly shown in FIGURES 4 and 5. Reducing the cross sectional area of the outlet 38 increases the back pressure of the fan and with the fan operating at constant speed, the volume of air discharged is reduced and lifting power of the fan is regulated.

A surprising and unexpected result of restricting the flow of air from the discharge outlet 38, is an almost instant change in the percentage by weight which is collected by the carrier air and carried over into the fines conduit. I find that by adjusting the valve setting the percentages released may be made very small and such a small percentage is characterized by a micron size of narrow range which can be selectively removed in a manner not otherwise achieved by commercial structures presently available on the market.

In one preferred form of the invention the outlet 38 may be connected to a special bag collector 60 which is shown in FIGURES 6 and 7. The collector 60 is provided with a valve controlled bottom outlet 64 through which fine particles introduced from conduit 62 may be removed. At the top of the collector 60 is an air return conduit 64 which extends downwardly as shown in FIGURE 7 and connects with the air inlet 30.

The collector 60 is intended to be illustrative of various forms of collectors which may be employed and in the preferred form shown in the drawings the collector is designed to provide for a recirculation of air with predetermined amounts of warm used air being discharged at one point and replaced at another point by approximately the same quantity of cool fresh air. Thus in the structure shown in FIGURES 6 and 7, used air is released through a valve controlled outlet 68 and cool fresh air is admitted through a valve controlled inlet 70.

In a typical operation of the machine with this form of collector, optimum results have been found to be realized by releasing from valve 68 approximately twenty percent of the air flow out of the collector system and by additionally balancing this discharge of air with an input of fresh air of approximately the same quantity through inlet member 70.

It is pointed out that desired fines are removed at both the outlet 26 and also at the collector 60 connected to the member 38. Thus materials recovered at two points increases the total percentage of fines which can be removed.

As illustrative of working one type of finely divided material, there may be cited the processing of wheat flour in order to remove a fraction of protein particles of very fine size. It should be understood that the usual grain of wheat, for instance, contains the protein commonly known as "Endosperm," to which is attached tiny starch particles. In the course of conventional grinding some of the attached starch particles become dislodged and there results grain having relatively higher percentages of protein contained therein. These high percentages of protein particles are desired for producing certain type of flours. Up to the present time a very difficult problem has been present in attempting to remove a very small fractional part, for example, ten percent or possibly less of the total flour mass which represents the protein fraction.

It is pointed out that the size of protein particles in flour may range from 1 or 2 microns up to about 10 to 15 microns, while the remaining particles in the flour may run from about 15 microns all the way up to 50 microns. Moreover, the percentages by weight of protein in a given quantity of flour may range from 5 to 6% all the way up to 14 or 15%. Thus it will be apparent that ideally, from the theoretical standpoint, it might be desirable to remove from 6% up to 15% by weight of a quantity of material, all of whose particles would be in the 1 to 15 micron range. As a practical matter, it has been found to be almost impossible with conventional machines to remove a 6% to 15% fraction of protein without retaining a large percentage of sizes running as high as up to 20 or 30 microns, or higher.

However, the method and machine of the invention has been found to make a significant and unexpected contribution to the art when dealing with this sort of problem. For example, the machine illustrated in the mass of particles through said annular port and into the annular space between the inner and outer casings, a rotating sizing device mounted between the distributor plate and the suction fan and within said inner casing for simultaneous rotation with said distributor plate and fan, an air inlet extending through the outer casing and into the inner casing and sealed from communication with the space between the inner and outer casings for directing a current of air into the inner casing in a direction to intercept the material cascading from the said distributor plate, a tubular outlet located at the top of the outer casing in tangential relationship therewith and having an arcuate aperture communicating with the space between the inner and outer casing to provide a passageway through which fine material may be removed along a path of travel which extends tangentially away from the outer casing, an adjustable valve in the said tubular outlet for restricting the flow of air therethrough to maintain in the inner sealed casing a volume of air less than the normal flow of air induced by the suction of the fan at the annular discharge port in the inner casing to regulate the lifting force of the fan and control the size and quantity of particles released from the inner casing, a normally closed discharge port for the outer casing located above the bottom thereof, and support and drive means for the distributor plate, suction fan and sizing device mounted at the top of the outer casing, said tubular outlet being connected to a particle collector member located in close proximity to the outer casing, a return conduit for returning air from the collector through the said air inlet, and said tubular outlet being connected to the outer casing at points closely adjacent to the extremities of he fan whereby the fan blades may cooperate with the tubular outlet to sweep particles with the arcuate aperture of the tubular outlet in a tangentially directed manner.

3. A structure according to claim 2 in which the return conduit includes valve means through which a portion of relatively warm air may be released, a second valve structure in said return conduit adjustable to admit cool air into the conduit.

4. In a method of air classifying, the steps which include cascading finely divided solid material downwardly into a closed chamber, removing portions of the cascading material from said chamber by a vacuum fan located on the outer side of the top portion of the closed chamber through a port formed in the latter, rotating he vacuum fan at a speed to provide a predetermined discharge, travelling the flow of material removed by the vacuum fan from the cascading mass through a rotating sizing device, discharging the flow of material from said rotating vacuum fan into a second closed chamber and causing the flow of material to reverse in direction and circulate around the chamber at a momentarily retarded rate of flow, removing from the second closed chamber along a tangentially extending path of travel occurring between the fan and said second closed chamber and immediately adjacent to the extremities of the fan blades portions of the air and solid material which are circulating at a retarded rate of flow, supplying air for the vacuum fan through a conduit opening into the first closed chamber in the direction of the cascading mass of material and restricting said flow from the said second closed chamber to a degree to create a back pressure on the normal discharge of air from said fan to modify the air flow characteristics of the fan at a given speed of rotation.

References Cited by the Examiner

UNITED STATES PATENTS

| 1,367,636 | 2/1921 | Sturtevant | 209—139 |
| 2,939,579 | 6/1960 | Hardinge | 209—144 |
| 3,090,487 | 5/1963 | Doyle | 209—139 |

HARRY B. THORNTON, *Primary Examiner.*

FRANK W. LUTTER, *Examiner.*